United States Patent [19]

Langberg

[11] Patent Number: 4,575,581
[45] Date of Patent: Mar. 11, 1986

[54] DIGITIZER AND POSITION ENCODERS AND CALIBRATION SYSTEM FOR SAME

[76] Inventor: Edwin Langberg, 13 Valley Forge Ct., Marlton, N.J. 08053

[21] Appl. No.: 577,597

[22] Filed: Feb. 6, 1984

[51] Int. Cl.[4] ............................................ G08C 21/00
[52] U.S. Cl. ..................................... 178/18; 33/1 M
[58] Field of Search ............... 178/18, 19, 20; 33/1 M

[56] References Cited

U.S. PATENT DOCUMENTS 4,317,005 2/1982 de Brugne .............................. 178/18

Primary Examiner—Stafford D. Schreyer

[57] ABSTRACT

Digitizer incorporates two novel position encoders. One position encoder comprises means for periodic spatial calibration against an accurate pattern of reference marks, thereby improving accuracy to the limit of resolution. Optionally, it also includes temperature and humidity compensation. Superior accuracy is achieved without tight tolerance requirements for mechanical components. The same technique can be used for error detection in digital motion control.

The other position encoder, used primarily for menu data entry, is based on a discrete resistor array, combined with pulse position modulation of array columns. Its main advantage is simplicity and low cost.

The digitizer is ergonomically designed, so that the operator can digitize coordinates with the left hand while inputing from the menu with the right hand.

16 Claims, 7 Drawing Figures

DIGITIZER AND POSITION ENCODERS AND CALIBRATION SYSTEM FOR SAME

FIELD OF INVENTION

This invention relates generally to equipment used to digitally encode position coordinates of a point on a surface, or in a threedimensional space. Position encoders are used in graphic digitizers. Position encoders are also used as computer data entry menu selection devices.

They are further used in computer motion control applications where desired coordinates are compared with the actual coordinates produced by position encoders. The difference between the actual and the desired position is used as an error signal to drive servo-actuators. Servo-controlled motion finds extensive application in x-y plotters, industrial machine tools positioning and other motion control applications.

PRIOR ART

One class of position encoder systems uses linear encoding elements or shaft encoding elements to convert position information of a point of measurement to digital output. Such encoding elements can have a very high resolution which, when converted to coordinate position of the point of measurement such as the cursor, a pen or a tool, can be as small as a fraction of a mil. An example of a system in this class is a restrained cursor graphic digitizer; i.e., a digitizer with a cursor rigidly fixed to a drafting head moving along coordinate arms in the x and y direction in a fashion similar to the drafting head of a drafting machine. Restrained cursor graphic digitizers are often used for high precision applications such as cartography. Applications such as these require a rock steady cursor that can move accurately in increments as small as 0.5 mils. The most precise digitizers in this class are called coordinatographs.

In order to assure such accuracy, the coordinatographs are made using heavy mechanical components with tight tolerance. The xy motion is typically restricted to the horizontal plane since the inclined board generates additional stresses due to the weight of the drafting head. These stresses depend on the inclination angle. The end result is that these devices are heavy, bulky, expensive and inconvenient to use.

If such extremes of mechanical tolerances are not applied and a more convenient inclined board is used, the mechanical linkages used to couple the encoding device to the point of measurement introduce a number of errors. For example, in a restrained digitizer, the cursor position is determined by the mechanical coupling of two rotary shaft encoder elements to the motion of the cursor along the x and the y axis. The overall accuracy of the digitizer is determined by the straightness of the coordinate arms, by run-out of various mechanical pulleys, and by other mechanical errors which cause a deviation between the actual position of the cursor and the corresponding rotation of the shaft encoders. In addition to fixed errors, variable errors are present such as thermal expansion of the arms or dimensional changes of the board and of the drafting media with humidity. At a modest cost, it is difficult to maintain an accuracy of better than about 0.05% of the mechanical span. In such a case, digitizing a D-sized drawing (which is 22"×34"), the linkage errors would be approximately 0.017". Hence, typically, the resolution can be readily made more than an order of magnitude better than the accuracy of the position encoding system.

In free cursor digitizers, the cursor or the stylus is attached to the rest of the device only by a flexible cable. The cursor interacts without physical contact in a wire-less fashion with wires imbedded in the board via electrostatic or electromagnetic coupling. This eliminates the mechanical linkage errors. However, the process of imbedding the wires in the digitizing tablets is subject to error which will show up as inaccuracy. Further, the effects of temperature and humidity variation cause errors. Here again resolution is easier to come by than the accuracy.

In yet another sub-class of free stylus digitizers, the digitizer is used to input the menu selection to the computers. Such computer input menu can consist, for example, of a list of electronic graphic symbols. The selection is made by touching the symbol or an adjacent area related to this symbol. Since a graphic symbol cannot be adequately displayed on an area less than approximately 0.025 in. sq., the resolution or the accuracy of the menu selector devices is not important in menu encoding application. The ergonomic ease of man-to-machine interaction, small size and low cost are important.

A typical device in this category is a pressure sensitive resistive membrane. Coordinates of a point are registered when an object presses a resistive cover membrane sheet against a resistive bottom surface, which has a position dependent voltage gradient on it. The x and the y full scale voltages are applied alternately to left-right and up/down boundaries of the bottom surface so that the voltage transferred to the top membrane represents alternately the x and the y coordinate. The interaction between the x and the y boundary electrodes, the irregularities in surface resistivity, and the finite area of contact contribute to reading error which, however, is not important for menu selection. Care must be exercised to ensure that the operator's hand does not rest on the digitizing surface causing inadvertent contact between the layers, the producing erroneous output data.

OBJECT AND SUMMARY OF THE INVENTION

One object of the present invention is to improve the accuracy of position encoders so that the accuracy approaches the limit of encoder element resolution. This is accomplished by acquiring and storing calibration data which correspond to an array of reference marks on a calibration standard sheet. To calibrate, the cursor is placed over a reference mark. A CALIBRATE button is pressed and the discrepancy between the known coordinates of the reference mark and the encoded coordinates of the same mark is calculated by a microprocessor and stored in an EEPROM memory. In operation, when digitizing a point, calibration values corresponding to neighboring calibration points are used, weighted in proportion to their distance from digitized point. The weighted calibration value, and temperature and humidity compensation, is added to the measured x, y coordinates to generate an accurate output.

The differential cost of adding the calibration feature is very modest because most modern digitizers already contain a built-in microprocessor control. Addition of an EEPROM integrated circuit and fabrication of calibration sheet is required, and means of temperature and humidity sensing are needed for ambient correction. On the other hand, to produce a comparable improvement of accuracy using high tolerance mechanical design is much more difficult and expensive.

Since mechanical components and linkages of a compensated restrained digitizer can be lighter, an ordinary x-y drafting machine mechanism can be converted to an accurate digitizer. The fact that such a digitizer can work accurately on an inclined surface represents a more convenient man-machine interface than the current horizontal coordinatographs.

It should be noted that the calibration approach described here, in conjunction with digitizers, can also be used for correction of x-y position in any servo-loop controlled positioning systems such as x-y plotters, machine tools, etc.

Another object of the invention is the design of a simple, inexpensive and easy to use menu encoder. The menu encoder combines the discrete resistor dividing network with the pulse position modulation. The operator holds a stylus with which he/she can touch one of the 256 contact electrodes on a menu encoder. Each contact corresponds to a command or to a graphic character indicated on an adjacent menu legend. The set of the graphic characters can be easily changed by removing a legend strip and the corresponding ROM containing the character information. Hence the menu encoder can be personalized to the field of interest of the user.

Yet another object of the invention is an accurate and economically designed digitizer, where the drawing or other graphics to be digitized are placed on an inclined drafting board, and the digitizer cursor is attached to a drafting head. Such a restrained cursor is steadier than a hand-held cursor in a free cursor digitizer. The operator can move the cursor using his left hand on the knob of a drafting board in a manner similar to an ordinary drafting machine. In his right hand, the operator holds a stylus and operates a menu selector described above.

The digitizer contains microprocessor-based electronics which services both encoders. The output of the digitizer is interfaced with a computer.

DESCRIPTION OF THE PREFERRED EMBODIMENT

Figure 1:
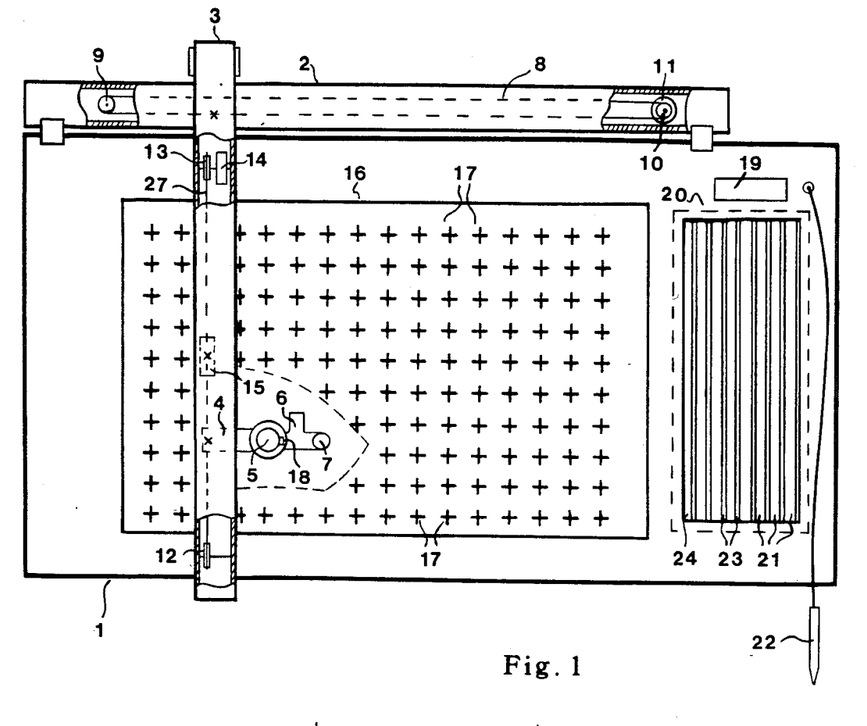
FIG. 1 shows a drafting board digitizer with a calibration sheet and a menu encoder.

Referring first to FIG. 1, there is illustrated a top view of the ergonomic digitizer. It shows a board 1, a first hollow longitudinal coordinate arm 2 extending in the horizontal direction, and fixedly mounted to board 1, and a second hollow longitudinal coordinate arm 3 orthogonally positioned with respect to first coordinate arm 2 and movable thereon. FIG. 1 further shows a drafting head 4 mounted to second coordinate arm 3 for movement along it, said head 4 equipped with a round handle 5, and the ruler attachment rails 6. Elements 1 through 6 resemble those of an ordinary drafting machine.

Digitizing cursor 7 is attached to one of the attachment rails 6 in place of a drafting ruler. The cursor 7 consists of an optical magnifier with a cross-hair reticle which allows an accurate manual alignment of the cursor with a point on the digitizing area of the board 1.

The first horizontal mechanical linkage consists of wire cable 8, pulley 9, pulley 10, and the first motion encoding element in the form of an optical incremental shaft encoder 11 which is coupled to pulley 10. The wire cable 8 is attached to the orthogonal arm 3, so that the horizontal motion (in the x direction) registers as rotation of the shaft encoder 11. The orthogonal arm 3 has inside of it the second mechanical linkage, consisting of wire cable 27, supported on pulleys 12 and 13. Cable 27 is attached to a counter-balancing weight 15 and to drafting head 4. The second motion encoding element, in the form of an optical incremental shaft encoder 14, is coupled to the rotation of pulley 13. Thus orthogonal motion (in the y direction) registers as rotation of the shaft encoder 14.

The standard reference sheet 16 is a polyester-based sheet of stable drafting material (such as drafting mylar) with accurate reference marks 17 printed on it at intersection of a 2-inch grid. In order to calibrate the digitizer, the operator places the standard reference sheet 16 on the board 1, lines up the cursor 7 with one of the reference marks 17, and presses switch 18 on handle 5 when the alignment of the cross-hairs of the cursor 7 with a reference mark 17 is satisfactory. The coordinate output at the time when switch 18 is pressed is displayed on digital display 19. The standard reference sheet 16 covers the entire digitizing area and has a dimension of a D-sized drawing; i.e., $22'' \times 34''$. Since the marks are on a 2-inch grid, the calibration marks constitute an array of $11 \times 17 = 187$ calibration marks. The standard reference 16 need not be a removable sheet. The surface of the board can be permanently marked with reference mark array.

When the operator wishes to digitize a drawing, he/she places the drawing on the board 1 in place of the standard reference sheet 16 (or on top of the sheet 16), lines up the cursor 7 with the point to be digitized and presses the switch 18. "Streaming" digitizing mode, which produces a flow of digitized coordinates, is also available.

Figure 2:
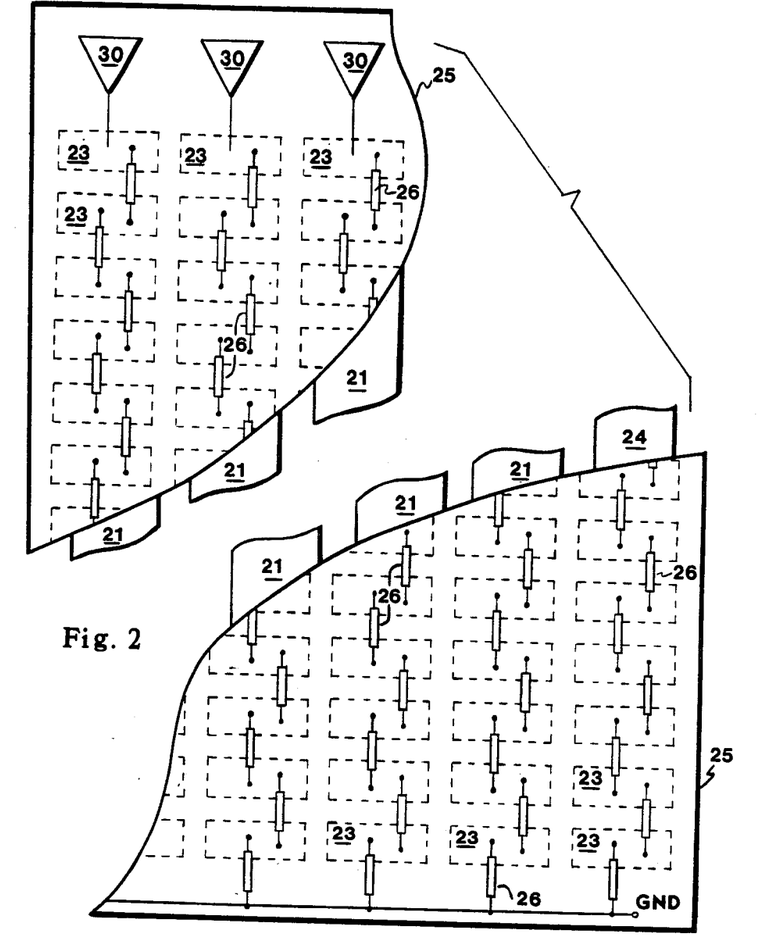
FIG. 2 shows the mechanical details of the menu encoder pad.

The menu encoder tablet 20, shown in top view in FIG. 1 and in more detailed bottom view in FIG. 2, services a menu array of eight columns of legends by 32 legends per column. Consequently, the menu array contains a total of 256 legends. The legends of the first column 24 refer to 32 graphic commands. This legend sheet is permanently attached to the tablet. The remaining seven columns are each associated with a different removable strip of legends 21 depicting graphic characters, so that the user can select the graphic characters most appropriate to his/her application. In order to invoke a command or a graphic character, the operator picks up the stylus 22 and touches the exposed portion of one of the metal electrodes 23, located immediately to the right of the character legend. The legend designation number appears on the display 19. From an ergonomic point of view, the operator uses his left hand for coordinate digitizing and his right hand for graphic commands and graphic character selection.

FIG. 2 shows a component view of a portion of the printed circuit board 25 used for menu encoding. The contact electrodes 23 are connected into a single 32-element column by 100 Ohm, 1% tolerance, ¼ watt resistors 26. The top electrode 23 is connected to a driver 30. All bottom electrodes are connected to the signal ground. The electrodes 23 are spaced one inch in the horizontal direction and ½ inch in the vertical direction thereby allowing enough room for the legend strips 21 and 24.

Figure 3:
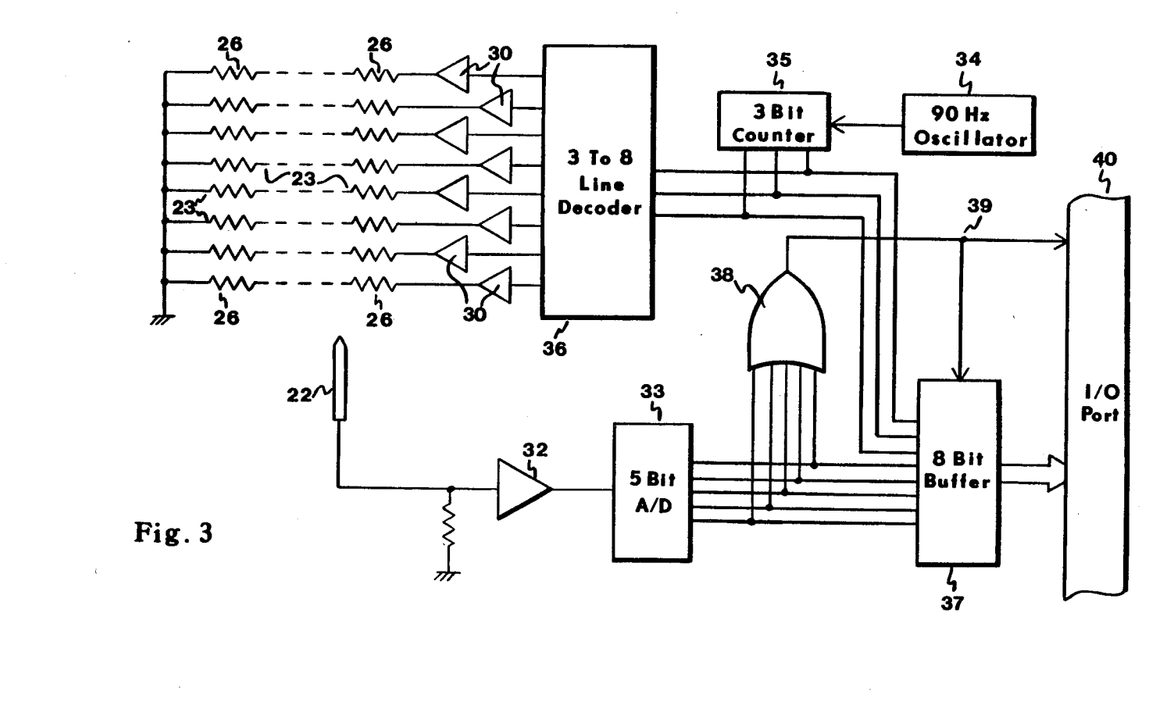
FIG. 3 shows the diagram of the electronics associated with the menu encoder.

FIG. 3 shows the circuit diagram of the menu encoder. Drivers 30 and array of resistors 26 have been described in conjunction with FIG. 2. Each of these drivers 30 sequentially generates a 10-volt pulse across the column of resistors connected to it. The stylus 22 contacts the electrode adjacent to the appropriate legend. The voltage amplitude registered by the stylus 22 depends on the position of the contacted electrode along the resistor network. The timing of the signal depends on the timing of the column contacted by the stylus. The signal transferred to the stylus is amplified and filtered by the amplifier 32 and converted by a 5-bit A/D converter 33 to a digital form. A 90 Hz oscillator 34 drives a 3-bit up/down counter 35. The outputs of the up/down counter 35 perform two functions: they drive the 3-to-8 bit line decoder 36 which sequentially operates drivers 30. The outputs of counter 35 also supply three most significant bits to the 8-bit buffer 37. This buffer accepts the input only when one of the output five lines generated by the A/D converter 33 is not zero. This depends on the signal timing and therefore on pulsing of the resistor column in contact with stylus 22. Timing recognition is provided by the OR gate 38. The output of the OR gate 38 on line 39 strobes the 8-bit buffer 37. It also sends a control signal to the I/O port 40 indicating that the new menu character is available from the output of the buffer 37.

Figure 4:
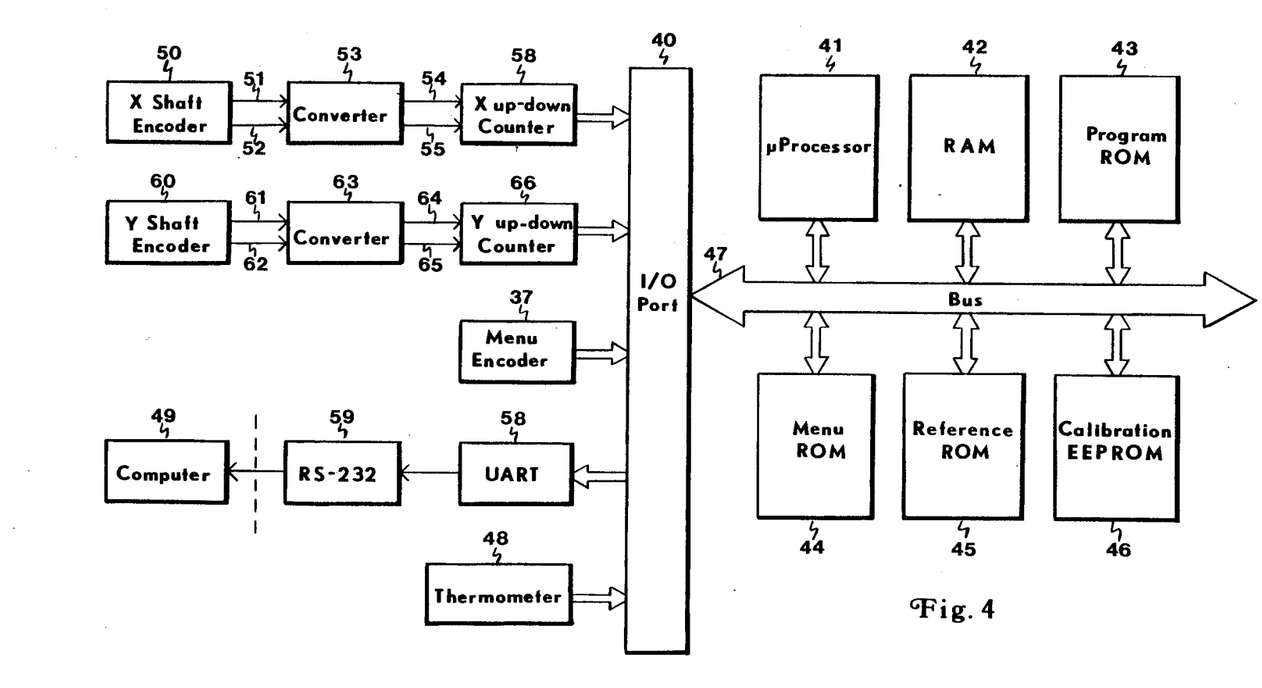
FIG. 4 illustrates the block diagram of the digitizer.

FIG. 4 shows the block diagram of the digitizer. The x-motion shaft encoder 50 transmits on line 51 the 0° phase pulses, and on line 52 the 90° phase pulses generated by the rotation of the shaft. These pulses are converted by converter 53 into clock pulses on line 54 and up/down signal on line 55. Lines 54 and 55 drive a 16-bit up/down counter 56.

The y-motion shaft encoder 60 drives, in an analogous manner, the y up/down counter 66. The output X' of the x up/down counter 56, the output Y' of the y up/down counter 66, and the output of the menu encoder buffer 37 are inputted to the I/O port 40. The I/O port 40 is in turn connected to the microprocessor bus 47. A microprocessor 41 has its program stored in the program ROM 43. The RAM 42 is associated with temporary storage during execution. The graphic commands and characters of the menu encoder are stored in the menu ROM 44. This ROM (or ROMs if more than one is required) can be interchanged depending on the choice of a specific legend strip used by the operator. Hence the menu encoder can be personalized to the user needs.

In the manufacture, it is expensive to generate very accurately spaced reference calibration marks on the standard reference sheet. It is more economical to print the reference sheets using a gravure press, or similar accurate printing technique, and measure reference positions of the end product. Any correction caused by the imperfection of the printing process is then stored on a standard reference ROM 45.

The calibration data are stored in electrically erasable programmable read only memory (EEPROM) 46. The erasability of EEPROM 46 allows the periodic recalibration of the equipment. Such recalibration is performed at a present inclination of board 1 and after the digitizer has time to settle to conditions of ambient air. It eliminates various fixed errors associated with the equipment. Temperature variations (and humidity, if desired) are measured by thermometer 48 equipped with digital output interfacing I/O port 40.

Figure 5:
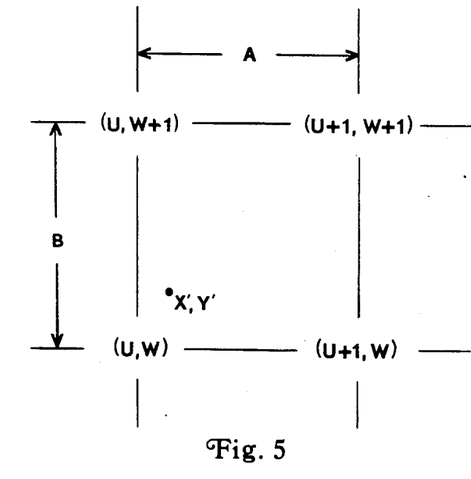
FIG. 5 shows the coordinate definitions for the calibration algorithm.
Figure 6:
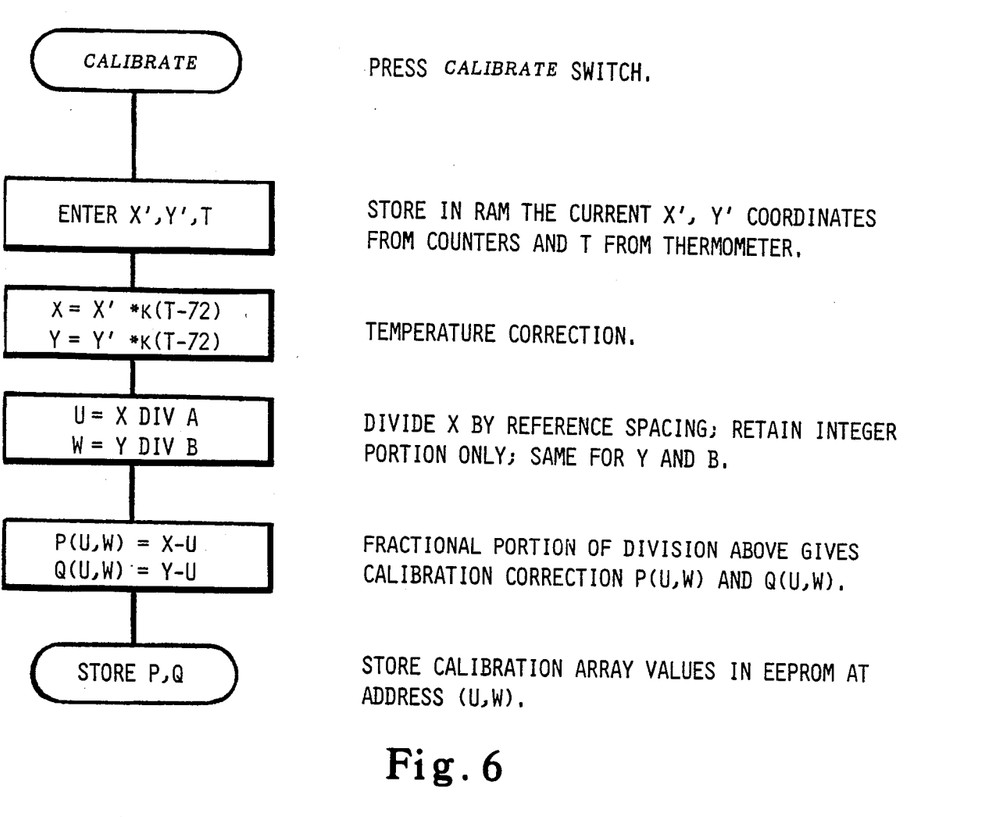
FIG. 6 shows the algorithm for calibration of the coordinate encoder.
Figure 7:
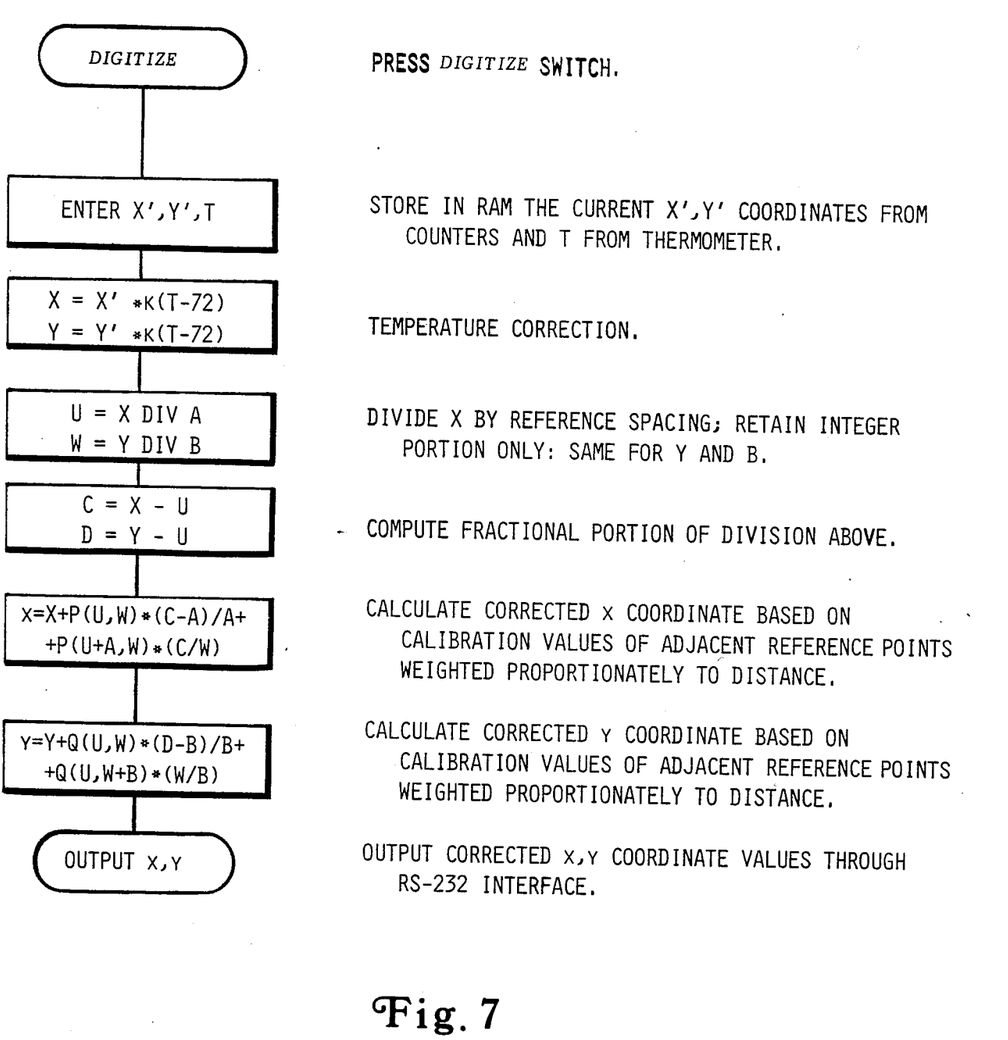
FIG. 7 shows the algorithm for generation of corrected output coordinates.

FIG. 5 shows the definition of the coordinate location which is used in conjunction with the correction algorithm in FIGS. 6 and 7. U is the horizontal coordinate designation of the reference mark and W is its vertical coordinate designation. Therefore, U, W uniquely define a location of a reference mark 17. The spacing of the reference points in the horizontal direction is A, and in the vertical direction is B. FIG. 5 also shows the coordinates of the arbitrary digitized point X', Y'.

FIG. 6 shows the algorithm used for calibration. When the cursor 7 is lined up with the reference mark 17, the operator presses switch 18 thereby initiating the calibration procedure. The X' and the Y' coordinates from counters 56 and 66 are entered via I/O port 40, then via the microprocessor bus 47, into RAM 42 overwriting earlier values. The temperature indication from the thermometer 48 is similarly updated. The X', Y' values are corrected to X, Y for temperature variation from the nominal value of 72° F., using a linear temperature correction coefficient k. The integer portion of the X/A gives the coordinate U of the reference point. Similarly, the integer portion of Y/B gives the reference coordinate W. The fractional portion of the division provides the calibration correction. This X calibration correction is stored in the calibration array P(U,W) and Y calibration in array Q(U,W) both located in EEPROM 46.

FIG. 7 shows the algorithm which is used during the digitizing operation of the calibrated coordinate encoder. When the operator lines up the cursor with the point which he wishes to digitize, he/she presses switch 18, which initiates the digitizing process. The X' and Y' coordinates from counters 56 and 66 are entered into RAM 42. The temperature indication from the thermometer 48 is also updated. The X', Y' values are corrected for temperature variation using a linear temperature correction coefficient k. Integer division identifies the nearest reference point U,W. The calculated coordinate corrections are based on stored calibration values corresponding to adjacent reference points weighted in proportion to the distance from the digitized point X', Y'. The corrected x, y coordinates are displayed on display 19 and outputted through UART 58 and RS-232 interface 59 to the attached computer 49.

Other configurations, as well as modifications, alternatives, omissions, refinements and substitutions will be apparent to those skilled in the art, as within the inventive scope, and although certain embodiments and descriptions have been provided, it is to be understood that various further configurations, modifications, alternatives, omissions, refinements and substitutions which depart from the disclosed exemplary embodiments may be adopted without departing from the spirit and scope of the invention.

I claim:

1. A position encoding system, comprising
means for encoding position coordinates of a point, a position reference medium containing reference marks, means for processing calibration data, said calibration data based on a value of encoded coordinates of the reference marks, operation means for correction of encoding errors in accordance with said calibration data, so as to improve accuracy and repeatability for said encoding of position coordinates.

2. System in claim 1, wherein said position reference medium is a sheet of drafting film with said reference marks made of contrasting lines.

3. System in claim 1, wherein said position reference medium is a metal foil and said reference marks are voids in the metal foil.

4. System in claim 1, wherein said means for encoding position coordinates of the point include a digitizing tablet and said position reference medium consists of contrasting reference marks which are an integral part of a surface of the tablet.

5. System in claim 1, wherein said means for processing calibration data include a measurement and an input of ambient conditions.

6. System in claim 1, wherein said means for processing calibration data comprise a positioning sensor which aids in an alignment process.

7. System in claim 1, wherein said calibration data are based on a subtraction of the known position coordinate value of each reference mark from the encoded coordinate value of the same reference mark, produced by said encoding means, and a storing of a difference in electronic memory as calibration data.

8. System in claim 1, wherein said operation means comprise a microprocessor which determines a correction of the encoding errors based on the calibration data of the nearest reference marks.

9. A position encoder, comprising an array of resistors, connected in series within separate columns of the array, differently modulated drivers energizing said resistor columns, electrodes in contact with terminals of said resistors, a stylus which on touching a specific electrode connects said electrode to an encoder electronic circuit, encoder electronic circuit which derives from an amplitude and modulation of a stylus signal an identity of the touched electrode and subsequently outputs a coded signal corresponding to said identity.

10. Apparatus in claim 9, wherein said differently modulated drivers generate pulses which sequentially energize said resistor columns.

11. Apparatus in claim 10, wherein the encoder electronic circuit consists of processing means of a stylus analog signal, followed by an analog-to-digital converter, a buffer which combines an output of the analog-to-digital converter with a sequential code, said code after decoding used to sequentially energize said resistor columns, said buffer providing a required digital output which identifies the electrode touched by the stylus.

12. Apparatus in claim 9, wherein differently modulated drivers generate different frequencies to energize different resistor columns.

13. Apparatus in claim 9, wherein said differently modulated drivers generate different phase signals to energize different resistor columns.

14. Apparatus in claim 9, wherein said electrodes have corresponding adjacent legends.

15. A graphic digitizer, comprising a board, a first hollow longitudinal coordinate arm fixedly mounted to said board, a second hollow longitudinal coordinate arm orthogonally positioned with respect to said first coordinate arm and movable thereon, a drafting head mounted on said second coordinate arm so as to allow movement along the said second coordinate arm, said drafting head thereby positionable along two axes over said board, a cursor mounted on said drafting head, a first motion encoding element mounted on first coordinate arm, a first mechanical linkage strung along a length of the first coordinate arm and attached to the second coordinate arm for transferring a motion of the second coordinate arm with respect to the first coordinate arm, to said first motion encoding element, a second motion encoding element mounted on the second coordinate arm, a second mechanical linkage strung along a length of the second coordinate arm and attached to the drafting head for transferring a motion of said drafting head and the cursor attached thereto with respect to the second coordinate arm, means for converting an output of said motion encoding elements to position coordinates, a position reference surface with reference marks thereon, means for gathering calibration data based on encoded coordinate values of the reference marks, means for storing calibration data, means for using said stored calibration data to improve accuracy of digitizing a position of said cursor relative to said board.

16. Digitizer in claim 15, wherein said board comprises also a menu tablet placed so as to not interfere with the movement of said drafting head.

* * * * *